May 10, 1938.    C. F. HEINZE    2,116,574
INTERNAL COMBUSTION MOTOR
Filed Nov. 12, 1934    3 Sheets-Sheet 1

INVENTOR
Charles F. Heinze
BY
ATTORNEY

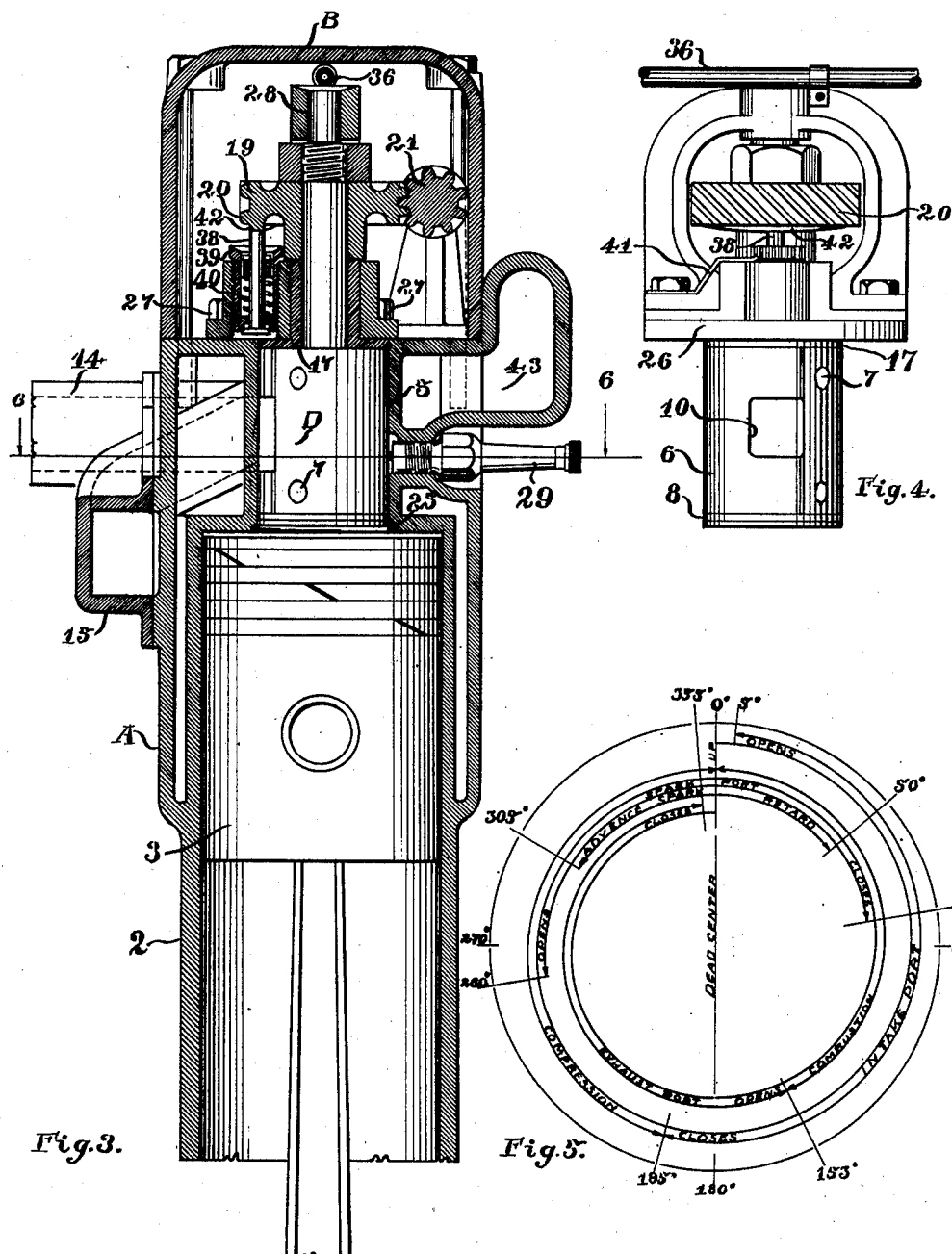

May 10, 1938. C. F. HEINZE 2,116,574
INTERNAL COMBUSTION MOTOR
Filed Nov. 12, 1934 3 Sheets-Sheet 3

INVENTOR
Charles F. Heinze
BY
ATTORNEY

Patented May 10, 1938

2,116,574

UNITED STATES PATENT OFFICE 2,116,574

INTERNAL COMBUSTION MOTOR

Charles F. Heinze, St. Paul, Minn.

Application November 12, 1934, Serial No. 752,675

7 Claims. (Cl. 123—190)

My invention relates to improvements in internal combustion motors, my motor being a four-cycle, fully water-jacketed engine.

Among my improvements is the provision of means whereby ignition of the gas is brought about in advance of its entry into the piston cylinder and takes place centrally of the body of the gas, cutting down the heating and carbonizing effects upon the piston and preventing knocking.

To this end I provide a rotary intake and exhaust valve for each piston cylinder, said valve being chambered to constitute an ignition chamber, with the spark plugs arranged in connection with said valve ignition chamber.

In connection with said valve I provide specially designed lubricating mechanism, as hereinafter set forth.

This and other features of my invention will be more fully brought out in the following description and the accompanying drawings, wherein:

Figure 3 is a vertical, longitudinal, sectional view through the piston cylinder and adjacent parts.

Figure 4 is a view in side elevation of the rotary ignition valve.

Figure 5 is a view of a chart illustrating the opening and closing position of the engine ports.

Figure 1:
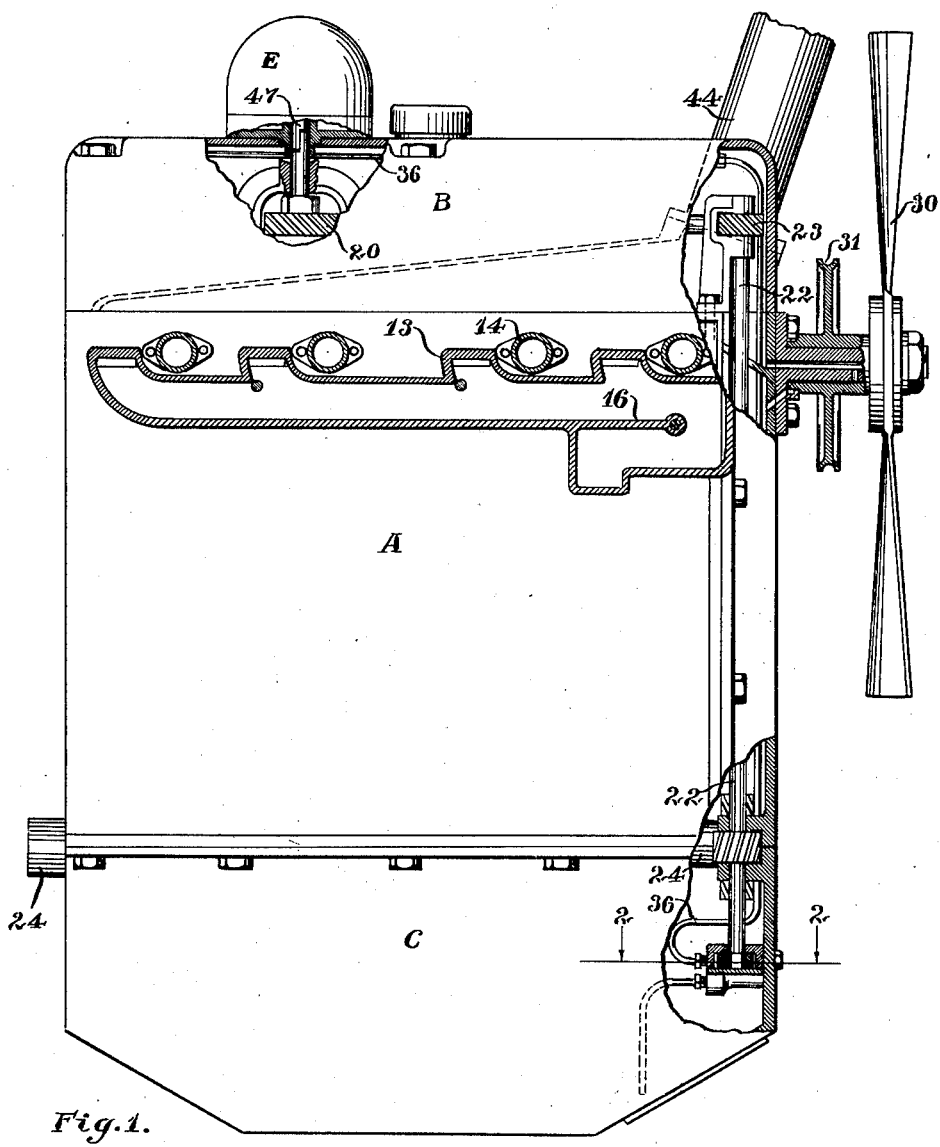
Figure 1 is a view in side elevation of an engine embodying my invention, shown partly broken away.

Referring to the drawings in detail, A represents the engine block, B the cover therefor, and C the oil pan below the block. Within the block are a plurality of cylinders 2, one of which is specifically shown in Figure 3, each cylinder containing the usual piston 3, connected by the connecting rod 4 with the usual crank shaft.

Each piston cylinder at its upper end is formed with an extended cylindrical portion 5 materially smaller than the piston containing part of the cylinder. Within each cylinder extension 5 is positioned the rotary valve D, which in operation rotates at one-half the crank shaft speed. The valve D consists of a cylindrical body portion surrounded by a split ring sleeve or collar 6.

Figure 7:
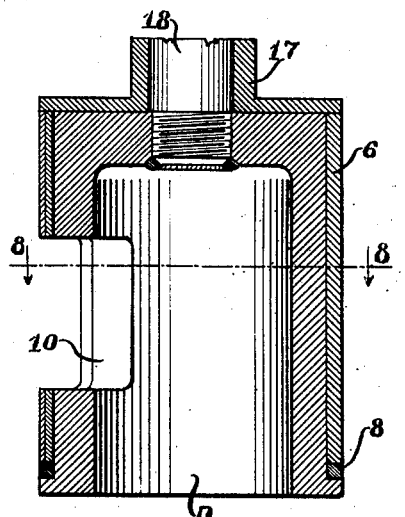
Figure 7 is an enlarged longitudinal, cross-sectional view through the rotary ignition valve.

The sleeve rests upon the body of the valve, as shown particularly in Figure 7, in a free-acting relationship to allow for expansion and contraction, and is held in relationship with the valve to rotate therewith by means of the knobs 7, loosely connecting the sleeve and body of the valve. These knobs are placed so as to exert a pulling effect upon the sleeve. The sleeve 6 is of uniform thickness throughout and slightly over-size so as to create a slight surface pressure and insure proper sealing at all times. At the bottom of the sleeve I have positioned an expansion ring 8 positioned between the sleeve 6 and the bottom flange 9 of valve D for the purpose of preventing the accumulation of carbon between the body and the sleeve. Each valve is formed with a port 10, which in operation of the engine, as hereinafter set forth, registers with the inlet ports 11 and exhaust ports 12, connecting with the intake and exhaust manifold 13 and 14, respectively.

The intake manifold, as shown in Figure 3, is partly formed within the body of the engine block and partly by the closing cap 15. The intake manifold is, therefore, most effectively subjected to the heat from inside the block. The intake manifold, as shown in Figure 1, also is formed with an inner flange 16 at the intake end of the manifold which acts to break up the heavy bodies in the gas mixture.

The valve body forms the principal part of the combustion chamber in contra-distinction to the ordinary construction where combustion takes place within the piston chamber. In the rotation of the valve, while the sleeve, by reason of the knobs 7 rotates with the valve, the expansion ring 8 will remain stationary. A collar 17 rests on top of the rotary valve and forms the upper part of the valve, rotating with said valve in operation.

Projecting upwardly from each rotary valve is a supporting rod 18 journaled within the cover of the engine block, each rod 18 carrying a spur gear 19 having oblique teeth 20 operated from the driving pinions 21 and shaft 22. The shaft 22 has gear connection 23 with the crank shaft 24.

The rotary valve further rests upon a ring 25 holding said valve from dropping into the main piston cylinder in any freeing of the rod 18 from its journal support.

Also, as shown in Figure 3, the spur gear 19 rests upon a housing 26 secured as by bolts 27 to the top of the block, thus helping to support the valve and co-related parts in a journaled position.

The supporting shaft for the rotary valve cylinder has journal support 28 above the spur gear 19. Spark plugs 29 are set in openings in the enclosing wall of the rotary valve, as best shown in Figure 3. The usual fan is indicated at 30, and 31 the fan belt pulley.

Figure 2:
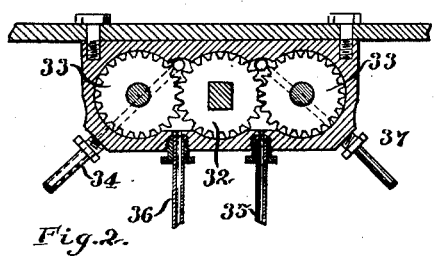
Figure 2 is a sectional view through part of the oil pumping mechanism.

For feeding oil to the parts I provide the following described mechanism:

Mounted upon the lower end of the shaft 22 is the gear pump specifically shown in Figure 2. This pump is of usual type embodying a central gear 32 and intermeshing gears 33, the gear 32 being mounted on the shaft 22. 34 and 35 indicate oil inlet pipes, and 36 and 37 outlet pipes leading to the valve mechanism and main bearings, respectively. The pipe 36 leads upwardly and across the inside of the top of the engine cover to feed oil to the valve parts, as shown in Figure 3. Oil from the pipe 36 within the cover will drip onto the bearings for the rod 18 and onto the gears 19 and 21 and into the bottom of the engine cover.

In order to secure a regulated feed of oil for the rotary valve D I provide the mechanism specifically shown in Figure 3. This consists of a plunger rod 38 supported in a cylinder 39 with the bottom head of the piston rod normally held raised in closed engagement with the bottom of the cylinder 39 by a coil spring 40. The cylinder 39 has a threaded support in the housing 26 secured upon the top of the engine block. The threaded support of the cylinder 39 in the housing 26 permits the vertical adjustment of said cylinder to regulate the amount of movement of the rod 38 and the feed of the oil. A spring tongue 41 exerts spring pressure on the cylinder 39.

The spur gear 19 at one side has a downwardly projecting cam 42 adapted, in the rotation of the gear, to permit a quantity of oil to drop upon the head of the engine block. This oil will work down around the wall of the rotary valve to keep the same lubricated. 43 indicates the usual water jacket forming part of the engine block and connected through the hose 44 to the radiator, not shown.

Figure 9:
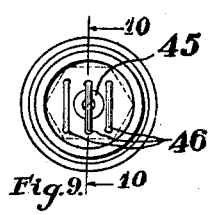
Figures 9 and 10 are plan and sectional views, respectively, of a modified construction of injector of the Diesel type, usable in place of the spark plug.
Figure 10:
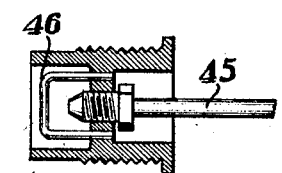

In Figures 9 and 10 are shown a Diesel type of injector that may be used in substitution for the spark plugs. As shown in Figures 9 and 10 this embodies the injector 45 positioned to discharge against the ignition wires 46. This injector operates in the usual manner with the wires 46 being heated by the heat from the internal combustion to a point to ignite the discharge from the injector.

Supported on top of the engine is the usual distributor or timer E. The shaft 47 of the distributor has detachable locking engagement with the upper end of the supporting shaft of one of the rotary valves, as specifically shown in Figure 1.

Figure 6:
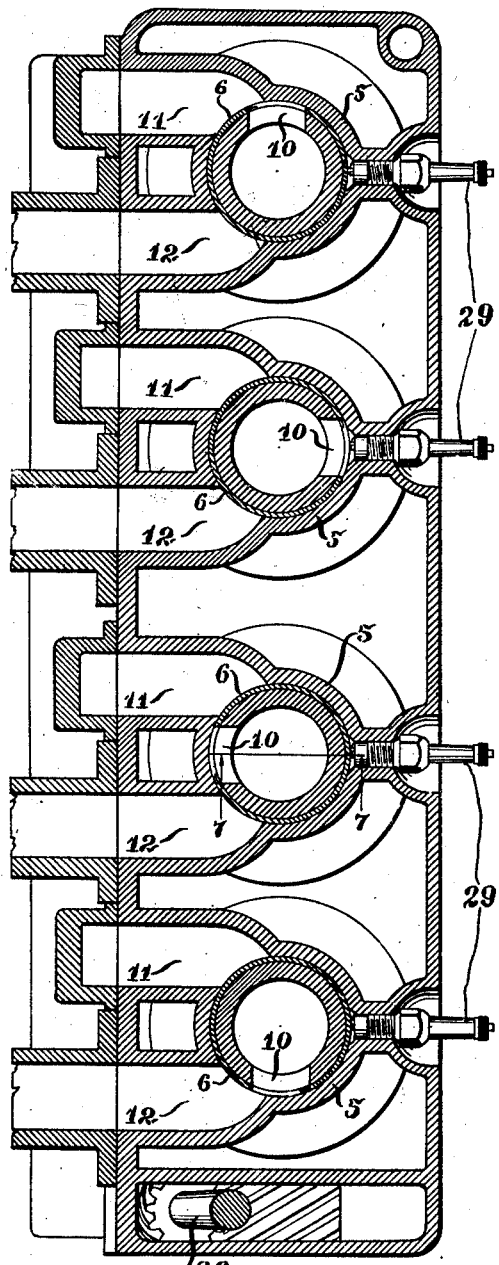
Figure 6 is a horizontal, sectional view through the rotary ignition valve and the intake and exhaust ports of the engine.
Figure 8:
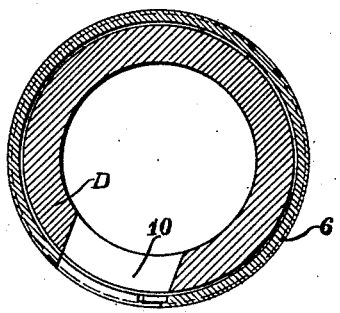
Figure 8 is a sectional view on line 8—8 of Figure 7.

Referring to Figure 6, the first ignition valve cylinder is shown just passing out of position of registration with the intake port. The second valve is shown in position of registration with the spark plug, bringing about the ignition and explosion of the gas. The third valve is shown in neutral position, and the fourth valve is shown in an exhaust position.

At this stage of the cycle of operation the actuation of the oil feed shown in Figure 3 will feed oil to the engine valve cylinder standing in neutral position.

In Figure 5 I have shown a cycle chart illustrating a full four-cycle operation of my engine. Referring to the chart, the intake port opens five degrees piston head past top center and closes fifteen degrees piston head past bottom center. Exhaust valve opens twenty-seven degrees piston head before bottom center and closes five degrees piston head before top center. The closing of intake valve and the opening of exhaust valve can be changed to any degree suitable to the individual manufacture by simply widening that particular side of port hole in the valve cylinder. The chart also shows a wide range in advancing or retarding the spark.

The valve, through its rotary motion, exerts a churning effect on the raw charge, and when the valve is in a hot condition any solidified gas is immediately broken up into a state of perfect vapor and then exposed to the fire. The gases are in perfect condition for complete combustion, which combustion is further assisted by scattering the fire caused by the churning effect of the valve.

Another very important factor is that the firing takes place midway between the top and bottom, the firing traveling both ways instead of one way, as with all conventional type engines. Under my system the combustion is far more perfect and consumed in just one-half the usual time, resulting in less unconsumed gas and more power.

Furthermore, by eliminating the poppet valves and the lack of efficiency of the spring actuation of such valves, particularly in high speed operation, I have overcome a very material objection to efficiency in internal combustion motors. I secure accuracy of timing, as shown in the chart, regardless of speed, a condition not found where poppet valves are employed.

My improved construction of rotary valve as has been pointed out, forms the principal part of the combustion chamber and possesses the additional advantage of only having one port hole exposed at any time to the combustion chamber, and of entirely sealing the spark plugs except for the short time of firing the charge. It, therefore, essentially differs from any poppet valve type where the poppet valves and spark plugs are constantly exposed to the combustion chamber.

I claim:

1. In an engine of the class described, including a valve chamber, a rotary valve mounted in said valve chamber, said valve being cup-shaped, said valve being formed to provide a port in the side wall thereof, a split sleeve loosely surrounding said valve, at least one loose connection between said valve and the leading edge of said sleeve in its normal direction of rotation, and said sleeve being formed to provide a port therein in alignment with the port in said valve.

2. The structure of claim 1, a shaft axially connected to the closed end of said valve, means for rotating said shaft and valve, a removable bushing surrounding said shaft and comprising a bearing therefor, said bushing having a flange overlying the closed end of said valve and the upper edge of said sleeve and comprising a thrust bearing for both, and an outwardly extending surrounding flange formed upon the open end of said valve, said last named flange comprising both a support for said sleeve and means for limiting the lateral movement of said open end.

3. The structure of claim 1, a shaft axially connected to the closed end of said valve, means for rotating said shaft and valve, a removable bushing surrounding said shaft and comprising a bearing therefor, said bushing having a flange overlying the closed end of said valve and the upper edge of said sleeve and comprising a thrust bearing therefor, an outwardly extending surrounding flange formed upon the rim of the open end of said valve, said last named valve comprising both a support for said sleeve and also means for limiting the lateral movement of said open end of said valve, means for supplying lubricant to the upper surface of said flange of said bushing, the side edge of said flange comprising means for supplying lubricant to the outside of said sleeve.

4. In an engine of the class described, including a valve chamber, a rotary valve mounted in said valve chamber and comprising a cup-shaped combustion chamber having a port in the side wall thereof, an integral, outwardly extending surrounding flange upon the open end of said valve, a removable flange supported against the opposite end of said valve, a split circular sleeve surrounding said valve between said fixed and removable flanges, said sleeve having a port in register with said valve port, said sleeve having a normal diameter greater than said valve, and means loosely connecting the valve and leading edge of the split sleeve in its normal direction of rotation to exert a pull upon said sleeve upon the rotation of said valve.

5. In an engine of the class described, including a valve chamber, a rotary valve mounted in said valve chamber and comprising a cup-shaped combustion chamber having a port in a side wall thereof, an integral, outwardly extending surrounding flange upon the open end of said valve, a removable flange supported against the opposite end of said valve, a split cylindrical sleeve surrounding said valve between said fixed and removable flanges, and having a port in register with said valve port, the edges of said sleeve overlapping at the port, said sleeve being formed to provide a plurality of openings therethrough adjacent the leading edge thereof in the normal rotation of said valve, and a plurality of pins carried by said valve chamber and projecting into said openings in a loose fit therewith.

6. In an engine of the class described, including a valve chamber, a rotary valve mounted in said chamber and comprising a cup-shaped combustion chamber having a port in a side wall thereof, a fixed outwardly extending surrounding flange upon the open end of said valve, a removable flange supported against the opposite end of said valve, a split cylindrical sleeve loosely surrounding said valve between said fixed and removable flanges, said sleeve having a normal diameter greater than said valve, the trailing edge of said sleeve overlapping the leading edge thereof in line with the port, a plurality of pins carried by the valve and loosely connecting said valve with the leading edge of said sleeve above and below the port in its normal direction of rotation, and said sleeve having a port in register with said valve port.

7. In an engine of the class described including a valve chamber, inlet and exhaust conduits connected thereto, a rotary valve mounted in said chamber and formed with a port communicating in timed relation with said intake and exhaust conduits, ignition means positioned at one side of the valve intermediate said intake and exhaust conduit openings, a sleeve loosely surrounding said valve, and a loose stop connection between said valve near the upper and lower edges of said sleeve above and below the plane of said port and adjacent the leading edge of said sleeve in its normal direction of rotation.

CHARLES F. HEINZE.